June 4, 1963 H. C. ROTERS ETAL 3,092,762
ROTARY SOLENOID
Filed May 9, 1960 3 Sheets-Sheet 1

INVENTORS
Herbert C. Roters, Willis A. Kropp,
BY  & George W. Harasym.

Atty.

June 4, 1963  H. C. ROTERS ETAL  3,092,762
ROTARY SOLENOID

Filed May 9, 1960  3 Sheets-Sheet 2

INVENTORS
Herbert C. Roters, Willis A. Kropp,
BY  & George W. Harasym.

Atty.

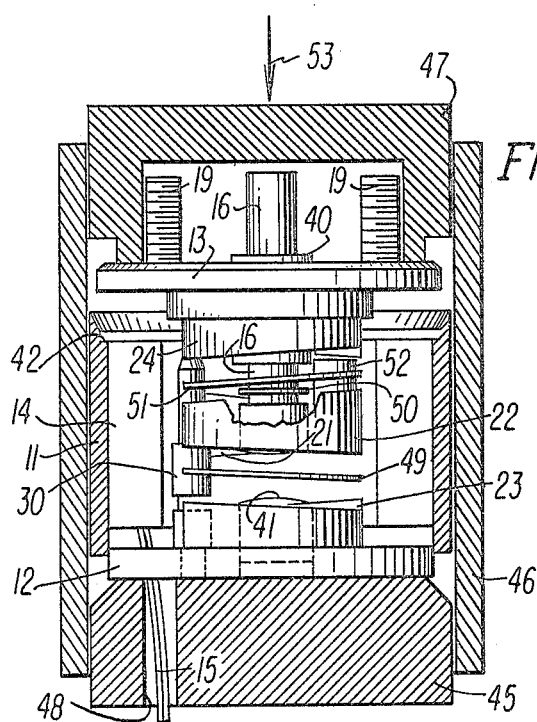
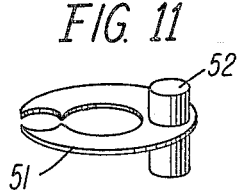
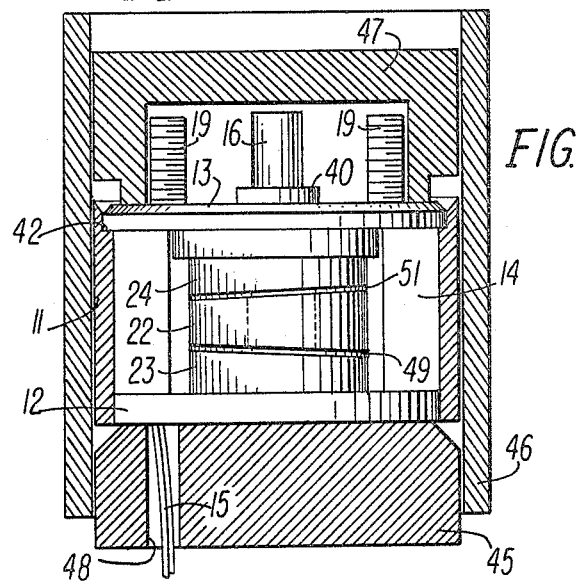

United States Patent Office 3,092,762
Patented June 4, 1963

3,092,762
ROTARY SOLENOID
Herbert C. Roters, Kew Gardens, N.Y., Willis A. Kropp, Rowayton, Conn., and George W. Harasym, Forest Hills, N.Y., assignors to General Time Corporation, New York, N.Y., a corporation of Delaware
Filed May 9, 1960, Ser. No. 27,723
5 Claims. (Cl. 317—197)

The present invention relates generally to rotary solenoids, that is, electromagnetic actuators for converting electrical energy into rotary mechanical movement. More particularly, the inventioin concerns the construction and assembly of a rotary solenoid.

Rotary solenoids have come into widespread use for the remote actuation of valves, electrical switches, etc., and as is common when use becomes widespread, the factors of efficiency, cost, and suitability for mass production, assume even greater importance in dictating a desirable design for such devices. Furthermore, rotary solenoids find utility in aircraft and missile instrumentation as well as similar applications so that a design which is light and compact is very desirable. Because of the linear acceleration forces encountered in aircraft and missiles, it is also very desirable to avoid having parts of a rotary solenoid move linearly upon actuation. Such axial movement of the rotating output element of a rotary solenoid also undesirably complicates the problem of torque take-off from the solenoid.

Accordingly, it is an object of the invention to provide a novel rotary solenoid which very efficiently converts electrical energy into rotary mechanical movement without linear or axial movement of any part of the solenoid.

It is also a very important object of the invention to provide a rotary solenoid of the above character which is exceptionally simple and compact in design, having few parts, and which is adapted for rapid, reliable assembly. A collateral object is to provide a rotary solenoid of the presently described type which is economical to manufacture and well suited for mass production.

In more detail, it is an object to provide a rotary solenoid of the above character in which an air gap is maintained between the relatively movable parts so as to avoid "sticking" but which permits a very small gap to be established so that an efficient magnetic circuit is created.

Another object is to provide a rotary solenoid which operates with little mechanical friction, having but a single rotary bearing. A related object is to provide a solenoid of this type in which no linear or axial thrust load is created by the magnetic forces even though operation of the solenoid decreases the air gap between the reatively movable parts for increased efficiency.

Yet another object is to provide a rotary solenoid of the type described above in which the output torque increases during the powered stroke. In this way, a substantially uniform net output torque is maintained when the solenoid acts against a resilient restoring force.

A further object is to provide a rotary solenoid as characterized above in which little armature or rotor chatter is permitted due to close end thrust tolerances that are easily established and maintained so that the solenoid is suitable for extreme vibration applications such as in aircraft and missiles.

In another aspect of the invention, it is an important object to provide a novel method of assembling a rotary solenoid of the type described that easily and accurately establishes the precise clearances required for efficient operation of the solenoid.

With more particularity, it is an object to provide a method of assembly as referred to above in which a single pressure stroke positions the solenoid parts so as to set precise air gaps and exact end thrust clearances for the relatively movable elements of the solenoid even though the solenoid parts are formed with relatively liberal tolerances.

Other objects and advantages of the invention will become apparent upon reading the following detailed description and upon reference to the drawings in which:

FIG. 9 is a section showing the subassemblies of FIG. 8 positioned in a jig for the assembly operation;

FIG. 10 is similar to FIG. 9 but showing the parts after the one stroke assembly operation; and FIG. 11 is a perspective view of a shim and positioning member used in the assembly operation shown in FIGS. 9 and 10.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Figure 1:
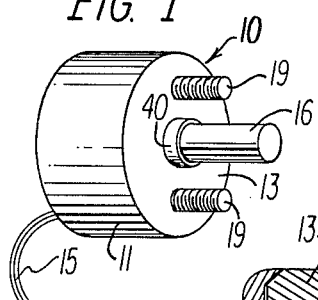
FIGURE 1 is a perspective view of a rotary solenoid constructed in accordance with the present invention.
Figure 2:
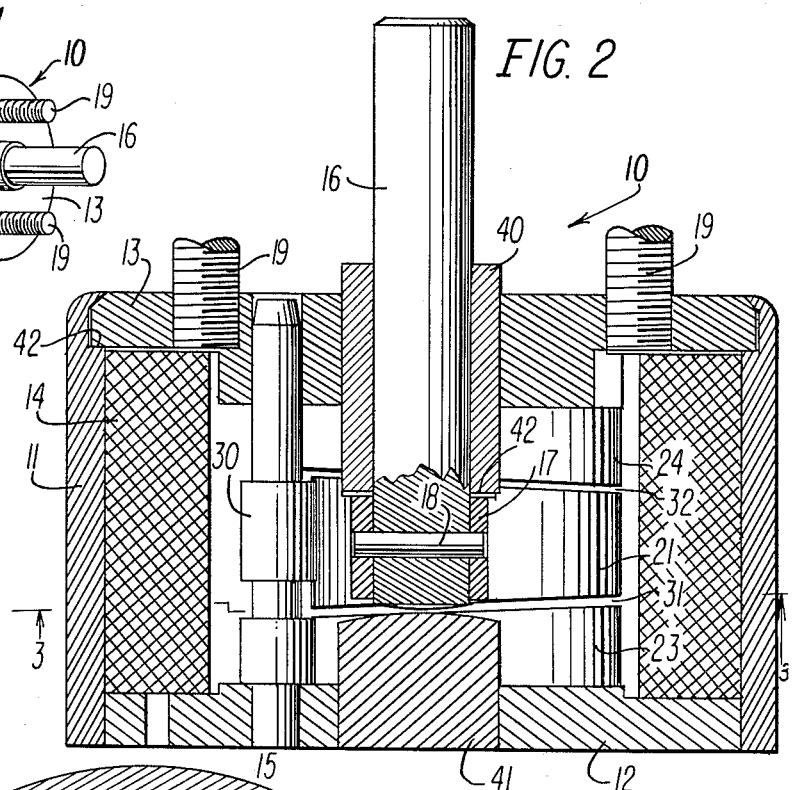
FIG. 2 is a transverse section of the solenoid shown in FIG. 1.
Figure 3:
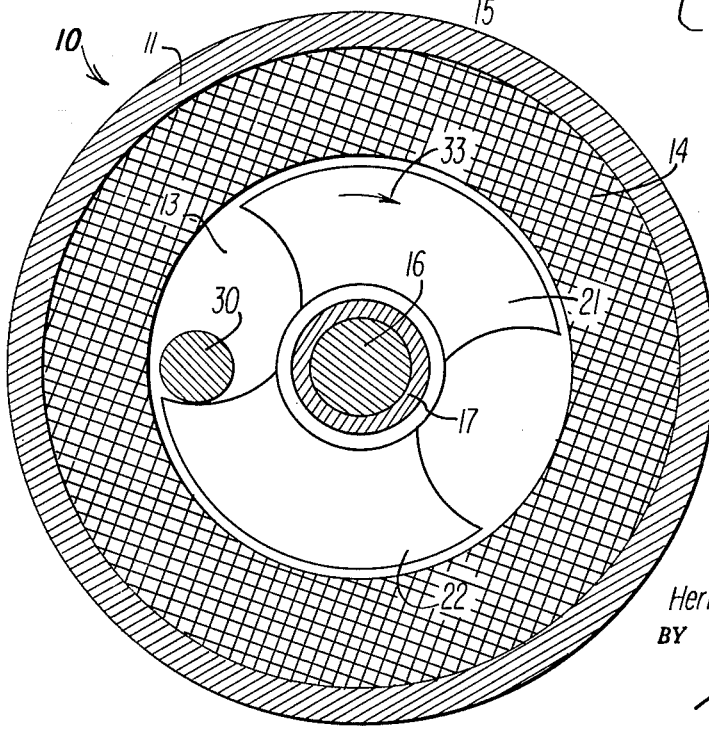
FIG. 3 is a section taken approximately along the line 3—3 in FIG. 2.
Figure 4:
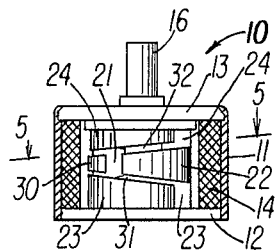
FIG. 4 is a partially diagrammtic section similar to FIG. 2 but on a reduced scale.
Figure 5:
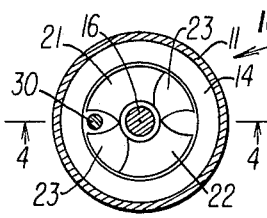
FIG. 5 is a section taken approximately along the line 5—5 in FIG. 4.

Turning now to FIGS. 1, 2 and 3 of the drawings, there is shown a rotary solenoid 10 embodying the present invention and being of generally cylindrical configuration. The solenoid includes an outer shell 11 having a base 12 and a cap 13 which together define the cylindrical shape of the solenoid. A solenoid coil 14 is secured within the shell 11 and is provided with leads 15 through which the coil is energized.

A drive shaft 16 is rotatably mounted in the solenoid 10 and carries a rotor 17 disposed within the annular coil 14. In the illustrated construction, the rotor 17 is rigidly secured to the drive shaft 16 by a pin 18. For mounting or installing the solenoid 10, a pair of threaded studs 19 are secured to the cap 13.

In operation, energizing the coil 14 causes the rotor 17 to swing through a rotary stroke which, in the illustrated embodiment, extends through approximately 45°. The solenoid is intended to operate a spring biased device so that the spring biasing force returns the device, and the solenoid drive shaft and rotor, to their normal starting positions when the coil 14 is deenergized.

Pursuant to the invention, the rotor 17 is formed to cooperate with pole pieces carried by the base 12 and the cap 13 so as to produce a balanced torque output which increases through the operating stroke of the solenoid. To this end, the rotor 17 includes opposed rotor portions 21, 22 formed of magnetic material and having a fan-like configuration (see FIG. 3). Cooperating with the rotor portions 21, 22 are a pair of pole pieces 23 formed integrally with the base 12 and a pair of pole pieces 24 formed integrally with the cap 13. The base 12 and the cap 13, together with their respective pole pieces, are formed of magnetic material. The pole pieces 23 are disposed in opposed relation on the base 12 and have fan-like contours matching the rotor portions 21, 22. The pole pieces 24 are similarly formed and are disposed in angular alinement with the pole pieces 23.

To limit the rotation of the rotor 17, a stop pin 30, preferably formed of non-magnetic material such as stainless steel, is secured between the base 12 and the cap 13 at one edge of one of each of the pole pieces 23, 24. With the rotor portion 22 swung against the stop pin 30, the position shown in FIG. 3, the rotor portions 21, 22 are in angular alinement with the pairs of pole pieces 23 and 24.

The rotor portions 21, 22 and the pole pieces 23, 24 have flat opposed surfaces which are slightly spaced so as to define air gaps 31 and 32 therebetween. The flat surfaces defining the air gaps 31, 32 are canted wtih respect to the axis of the drive shaft 16 so that they slope toward the central transverse plane of the rotor 17 in the direction in which the rotor moves when the solenoid is energized. In FIG. 3, the direction in which the rotor 17 moves upon energization of the coil 14 is indicated by the arrow 33. Thus, the opposed flat surfaces of the rotor portion 21 and the adjacent pole piece 23 which define the air gap 31 slope upwardly as seen in FIG. 2 toward the central transverse plane of the rotor 17. The flat opposed surfaces of the rotor portion 21 and the adjacent pole piece 24 which define the air gap 32 slope downwardly in the direction of rotor movement toward the central transverse plane of the rotor.

Since the opposed flat surfaces which define the air gaps 31, 32 are sloped in the manner described above, the surfaces closely approximate, or may even be machined to define, a true helicoid configuration. A helicoid is not, speaking in a strict geometrical sense, a "flat" surface and hence the term "flat" has been used herein and in the following claims in its more common, dictionary-defined sense of describing a surface " . . . that is smooth and even, or relatively so."

The operation of the solenoid 10 can be best seen in FIGS. 4 to 7. In the normal or rest position, the rotor portion 21 is swung against the stop pin 30 so that the parts assume the positions shown in FIGS. 4 and 5. When in operation, the spring biased device to which the solenoid 10 is coupled urges the drive shaft 16 to this normal or rest position. It will be noted that the air gaps 31, 32 are somewhat appreciable in this position of the rotor 17.

Figure 6:
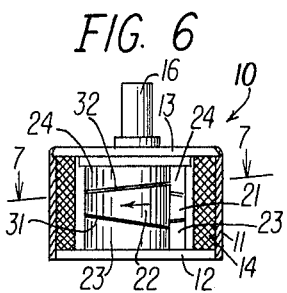
FIG. 6 is similar to FIG. 4 showing the solenoid parts in an alternate operating position.
Figure 7:
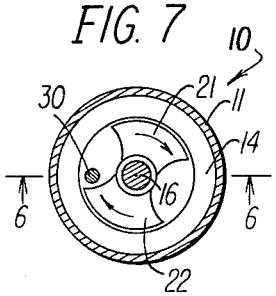
FIG. 7 is similar to FIG. 5 and is taken approximately along the line 7—7 in FIG. 6.
Figure 8:
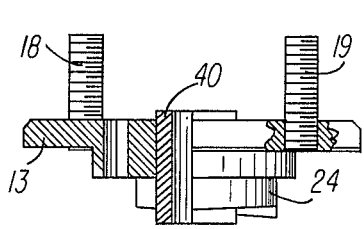
FIG. 8 is an exploded view, partially in section, of the subassemblies making up the solenoid shown in FIG. 1 before the several parts are moved into assembled position.
Figure 8:
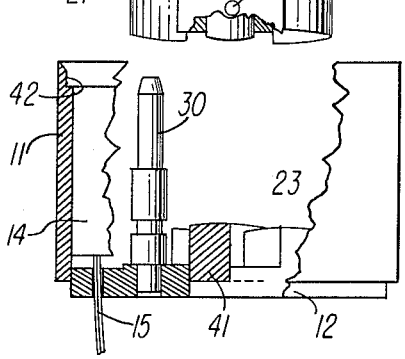

Upon energization of the coil 14, the rotor portions 21, 22 are pulled into alinement with the pole pieces 23, 24 by the magnetic forces created so that the drive shaft 16 is driven through its operating stroke until the rotor portion 22 abuts the stop pin 30. This position of the parts is shown in FIGS. 6 and 7. Because of the canted or inclined disposition of the surfaces defining the air gaps 31, 32, it can be seen that the air gaps are significantly decreased as the rotor portions 21, 22 are pulled between the pole pieces 23, 24. In addition, the reluctance of the magnetic circuit defined by the rotor portions 21, 22 and the pole pieces 23, 24 is further materially decreased as the rotor portions swing into alinement with the pole pieces. As a result, the output torque exerted by the solenoid 10 through the drive shaft 16 increases as the shaft moves through its operating stroke. Since the solenoid 10 is intended to work against a spring biased load, the increasing resistance of the spring to movement of the load is offset by the increasing torque exerted by the shaft 16 so that the net torque output will remain reasonably uniform.

Since the rotor is equally attracted by the opposite pairs of pole pieces 23 and 24, the magnetic forces induced upon energization of the coil 14 are balanced and do not create an axial thrust load upon the rotor or the drive shaft 16. Furthermore, it can be seen that the solenoid operates without linear movement of the drive shaft 16.

In accordance with the invention, the rotary solenoid 10 is fabricated for rapid, reliable assembly in a manner which establishes and maintains close end thrust clearances for the rotor and shaft as well as very slight mean air gaps between the rotor portions 21, 22 and the pole pieces 23, 24. Toward this end, the drive shaft 16 is journalled in a bearing 40 that is press fitted into an opening formed in the center of the cap 13. The lower end of the shaft 16 rides on a thrust plug 41 which is press fitted into an opening formed at the center of the base 12. Disposed between the bearing 40 and the rotor 17 in the preferred construction is a thrust washer 42.

It can thus be seen that the end thrust clearances for the shaft 16 and the rotor 17 are determined by the spacing between the bearing 40 and the thrust plug 41 and also, in the preferred construction, the thickness of the thrust washer 42. In the preferred embodiment, a mean end thrust clearance for the shaft and rotor assembly of 0.0005 of an inch is easily and reliably established and maintained.

Returning to the fabrication of the solenoid 10, the base 12 is press fitted up into the shell 11 and the cap 13 is rested on an annular shoulder 42 formed at the top of the shell 11 with the cap being anchored against the shoulder by crimping the edge of the shell over onto the outer surface of the cap 13. Since the pole pieces 23, 24 are formed integrally on the base 12 and cap 13 respectively, the air gaps 31, 32 are determined by the spacing of the base 12 from the shoulder 42 on which the cap 13 is anchored. In the illustrated construction and assuming the rotor 17 to be centered between the pairs of pole pieces 23, 24, a mean minimum width of 0.003 of an inch for the air gap 31, 32 can be easily established and maintained.

In carrying out the invention, the solenoid 10 is assembled so that a single pressure stroke positions the press fitted parts to easily and accurately establish the precise clearances resuired for efficient operation. In the preferred method, a simple jig is used including an anvil 45, sleeve 46 and plunger 47. To describe the preferred method of assembly the steps involved will be considered in approximately their proper sequence. First, three subassemblies are formed consisting of the cap 13 and the bearing 40, the drive shaft 16 and the rotor 17, and the remaining parts of the solenoid. To form these subassemblies, the threaded studs 19 are mounted in the cap 13 and the bearing 40 is press fitted into the cap so that it extends in the direction of the pole pieces 24 beyond its normal position in the assembled solenoid.

The rotor-shaft subassembly is formed by simply securing the rotor onto the shaft by fitting the pin 18 into place.

To form the third subassembly, the pin 30 is press fitted into an aperture provided in the base 12 and the sleeve 11 carrying the coil 14 is partially press fitted onto the base 12. The coil leads 15 are passed through a suitable aperture in the solenoid base 12. To complete the subassembly, the thrust plug 41 is press fited into the base 12 so as to extend in the direction of the pole pieces 23 beyond the normal position occupied by the plug in the assembled solenoid.

Having completed the three subassembly operations, the shell and base subassembly is positioned on the anvil 45 within the sleeve 46. The leads 15 from the coil 14 are extended through an opening 48 formed in the anvil. A shim 49 is then placed on the base pole pieces 23. In the preferred method intended to produce the representative clearances set forth above, the shim 49 has a thickness of 0.0025 of an inch.

Next, the rotor 17 is placed on top of the shim 49 with the drive shaft 16 extending upwardly. A washer 50 is dropped about the shaft 16 and a second shim 51 is placed on the rotor portions 21, 22. Again with reference to the preferred method, the washer 50 has a thickness of 0.006 of an inch and the shim 51 has a preferred thickness of 0.0035 of an inch.

In order to keep the rotor portions 21, 22 in alinement with the pair of pole pieces 23 and to properly aline the pole pieces 24 with the rotor portions 21, 22, an alinement member 52, preferably secured to the shim 51, is fitted between the pair of pole pieces 24 and the rotor portions 21, 22.

The cap subassembly is next positioned with the cap 13 being rested on the shoulder 42 so that the pole pieces 24 face the shim 51 and the bottom of the bearing 40 faces the washer 50.

As a single positioning step, the annular plunger 47 is brought into abutment with the upper surface of the cap 13 and is driven in the direction of the arrow 53 so as to sandwich the parts of the solenoid 10, the shims 49, 51 and the washer 50 tightly together (see FIG. 10). When the cap 13 is driven downwardly, the shell 11 is press fitted over the base 12 a distance determined by the combined thickness of the shims 49, 51. The downward movement of the cap 13, acting through the shim 51, the rotor 17 and the shaft 16, drives the thrust plug 41 downwardly while the bearing 40 abuts the washer 50 and is pushed upwardly a distance determined by the thickness of the washer.

Following the striking of the plunger 47, the cap 13 is lifted from the shoulder 42 and the shims 49, 51 and the washer 50 are removed from the sandwiched assembly. In the preferred construction, the washer 50 is replaced by the thrust washer 42 which, in the illustrative embodiment, has a preferred thickness of 0.005 of an inch. The solenoid is then reassembled and the edge of the shell 11 is crimped over onto the cap 13 to anchor the cap against the shoulder 42.

Since, in the preferred construction, the combined thickness of the shims 49, 51 was 0.006, this dimension becomes the combined width of the air gaps 31, 32 when the solenoid is in its energized FIG. 6 and 7 position. Thus, a mean minimum air gap of 0.003 of an inch is established.

Since the thrust washer 42 is 0.001 of an inch less thick than the washer 50 used in assembling the solenoid, it can be seen that the rotor and the drive shaft in the assembled solenoid will have a mean end thrust clearance of 0.0005. It will also be appreciated that since the entire allowable end thrust of 0.001 of an inch is introduced above the rotor 17 in FIGS. 2, 9 and 10 by substituting the thrust washer 42 for the washer 50, and since the shim 51 is 0.001 of an inch thicker than the shim 49, the rotor portions 21, 22 in the assembled solenoid become positioned precisely midway between the pole pieces 23 and 24.

Of course, if it is not desired to provide a thrust washer similar to the washer 42 in the finally assembled solenoid, a washer similar to the washer 50 but having a thickness equal to the desired total end thrust of the shaft and rotor is used in the assembly operation.

It can now be seen that the solenoid 10 is unusually simple and compact in design, and is particularly well adapted for rapid, reliable assembly so that the solenoid is very economical to manufacture and well suited for mass production. The precise air gaps and exact end thrust clearances required for efficient operation are established by an easily performed one-stroke step. Also, these desirable dimensions are not dependent on forming the solenoid parts to exact tolerances and hence the solenoid parts can be economically formed with relatively liberal tolerances.

We claim as our invention:

1. A rotary solenoid comprising, in combination, a cylindrical shell having a base press fitted into one end and a cap anchored against a shoulder formed at the other end of the shell, a thrust plug press fitted into an opening at the center of said base, a cylindrical bearing press fitted into an opening at the center of said cap, said base and cap carrying pole pieces within said shell, said pole pieces being in angular alinement about said plug and bearing, a shaft journalled in said bearing and carrying a rotor disposed between said pole pieces on said base and cap, and a coil mounted within said shell about said pole pieces and said rotor, said rotor being closely sandwiched between said thrust plug and said bearing so as to minimize end thrust of the shaft and establish precise air gaps between the rotor and said pole pieces.

2. A rotary solenoid comprising, in combination, a shell having a base at one end and a cap anchored at the other end of the shell, a thrust plug mounted at the center of said base, a cylindrical bearing fitted into an opening at the center of said cap, said base and cap carrying pole pieces within said shell, said pole pieces being in angular alinement about said plug and bearing, a shaft journalled in said bearing and carrying a rotor disposed between said pole pieces on said base and cap, and a coil mounted within said shell about said pole pieces and said rotor, said rotor being closely sandwiched between said thrust plug and said bearing so as to minimize end thrust of the shaft and establish precise air gaps between the rotor and said pole pieces.

3. A rotary solenoid comprising, in combination, a cylindrical shell having a base press fitted into one end and a cap anchored against a shoulder formed at the other end of the shell, a thrust plug press fitted into an opening at the center of said base, a cylindrical bearing press fitted into an opening at the center of said cap, said base and said cap each carrying a pair of pole pieces extending oppositely from said plug and bearing respectively and being in angular alinement, a shaft journalled in said bearing and carrying a rotor having opposed portions disposed between said pairs of pole pieces, a stop extending between two angularly alined pole pieces of said pairs at one edge thereof so that rotation of said rotor in one direction against said stop angularly alines the opposed rotor portions with said pole pieces, said rotor portions and pole pieces having flat opposed surfaces spaced to define slight air gaps when said rotor is rotated in said one direction against the stop, said opposed surfaces being canted with respect to said shaft so as to slope in said direction toward the central transverse plane of the rotor, said rotor being closely sandwiched between said thrust plug and said bearing so as to minimize end thrust of the shaft and maintain said air gaps between the rotor and said pole pieces.

4. A rotary solenoid comprising, in combination, a shell having a base at one end and a cap anchored at the other end of the shell, a thrust plug mounted at the center of said base, a cylindrical bearing fitted into an opening at the center of said cap, said base and said cap each carrying a pair of pole pieces extending oppositely from said plug and bearing respectively and being in angular alinement, a shaft journalled in said bearing and carrying a rotor having opposed portions disposed between said pairs of pole pieces, a stop extending between two angularly alined pole pieces of said pairs at one edge thereof so that rotation of said rotor in one direction against said stop angularly alines the opposed rotor portions with said pole pieces, said rotor portions and pole pieces having flat opposed surfaces spaced to define slight air gaps when said rotor is rotated in said one direction against the stop, said opposed surfaces being canted with respect to said shaft so as to slope in said direction toward the central transverse plane of the rotor, and a coil mounted within said shell about said pole pieces and said rotor, said rotor being closely sandwiched between said thrust plug and said bearing so as to minimize end thrust of the shaft and maintain said air gaps between the rotor and said pole pieces.

5. A rotary solenoid comprising, in combination, a shell having a base and a cap so as to define a cylindrical chamber, said base and said cap each carrying a pair of pole pieces extending oppositely from their centers and being in angular alinement, a shaft journalled in said cap and carrying a rotor having opposed portions disposed between said pairs of pole pieces, a stop extending between two angularly alined pole pieces of said pairs at one edge thereof so that rotation of said rotor in one direction against said stop angularly alines the opposed rotor portions with said pole pieces, said rotor portions and pole pieces having flat opposed surfaces spaced to define slight air gaps when said rotor is rotated in said one direction against the stop, said opposed surfaces being canted with respect to said shaft so as to slope in said direction toward the central transverse plane of the rotor.

References Cited in the file of this patent
FOREIGN PATENTS
1,130,328    France _____ Feb. 4, 1957